(12) United States Patent
Schneidewind et al.

(10) Patent No.: US 11,724,585 B2
(45) Date of Patent: Aug. 15, 2023

(54) TWO MOTOR POWER-SPLIT HYBRID SYSTEM WITH SELECTABLE ONE-WAY CLUTCH ENABLED LOCKABLE PLANETARY GEAR SETS FOR TWO-SPEED DUAL MOTOR EV AND ENGINE PLUS DUAL MOTOR DRIVE MODES

(71) Applicant: TOYOTA MOTOR ENGINEERING & MANUFACTURING NORTH AMERICA, INC., Plano, TX (US)

(72) Inventors: Brian Schneidewind, Ann Arbor, MI (US); Nicholas Vernon, Brighton, MI (US); Geoffrey D. Gaither, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/733,168

(22) Filed: Apr. 29, 2022

(65) Prior Publication Data
US 2022/0258592 A1 Aug. 18, 2022

Related U.S. Application Data

(62) Division of application No. 16/582,431, filed on Sep. 25, 2019, now Pat. No. 11,364,787.

(51) Int. Cl.
*B60K 6/442* (2007.10)
*B60K 6/26* (2007.10)
(Continued)

(52) U.S. Cl.
CPC .............. *B60K 6/442* (2013.01); *B60K 6/26* (2013.01); *B60K 6/365* (2013.01); *B60K 6/383* (2013.01);
(Continued)

(58) Field of Classification Search
CPC . B60K 6/442; B60K 6/26; B60K 6/36; B60K 6/365; B60K 6/38; B60K 6/383; B60K 6/387; B60K 2006/268
See application file for complete search history.

(56) References Cited

U.S. PATENT DOCUMENTS 7,399,246 B2 * 7/2008 Holmes .................. B60K 6/547
475/5
8,075,435 B2 * 12/2011 Si ........................... B60K 6/547
475/5
(Continued)

*Primary Examiner* — John D Walters
(74) *Attorney, Agent, or Firm* — Oblon, McClelland, Maier & Neustadt, L.L.P.

(57) ABSTRACT

A hybrid drive train includes a first electric motor, a nested power splitting planetary gear set having a first carrier element and a second carrier element, an inner sun gear coupled with the first electric motor and an outer sun gear coupled with an output shaft. A first selectable one-way clutch controls the first and the second carrier element, and switches between operation as a one way clutch and operation as a brake. A second selectable one-way clutch controls a ring gear of the nested planetary gear set, and switches between operation as a one way clutch and operation as a brake. The extra outer planetary gear set improves lowing capacity at higher speeds without substantially increasing the axial length of the power split device.

6 Claims, 17 Drawing Sheets

(51) Int. Cl.
*B60K 6/365* (2007.10)
*B60K 6/387* (2007.10)
*B60K 6/383* (2007.10)

(52) U.S. Cl.
CPC ........ *B60K 6/387* (2013.01); *B60K 2006/268* (2013.01)

(56) References Cited

U.S. PATENT DOCUMENTS

| | | | |
|---|---|---|---|
| 8,409,040 B1 * | 4/2013 | GV | F16H 3/728 |
| | | | 475/5 |
| 8,882,627 B2 | 11/2014 | Kersting | |
| 9,193,252 B2 * | 11/2015 | Tuckfield | B60K 6/365 |
| 9,457,795 B2 * | 10/2016 | Imai | B60K 6/52 |
| 10,710,447 B2 * | 7/2020 | Kasahara | B60K 6/445 |
| 2011/0111907 A1 * | 5/2011 | Kim | B60K 6/365 |
| | | | 475/5 |
| 2014/0025242 A1 | 1/2014 | Kuramoto et al. | |
| 2015/0046011 A1 | 2/2015 | Imai et al. | |
| 2017/0282702 A1 | 10/2017 | Kim | |

* cited by examiner

TWO MOTOR POWER-SPLIT HYBRID SYSTEM WITH SELECTABLE ONE-WAY CLUTCH ENABLED LOCKABLE PLANETARY GEAR SETS FOR TWO-SPEED DUAL MOTOR EV AND ENGINE PLUS DUAL MOTOR DRIVE MODES

CROSS REFERENCE TO RELATED APPLICATION

This is a divisional application of U.S. application Ser. No. 16/582,431, filed Sep. 25, 2019, the entire contents of which is hereby incorporated by reference herein in its entirety.

BACKGROUND

Technical Field

The present disclosure is directed to a two motor power-split hybrid system having at least one selectable one-way clutch to controllably lock planetary gear sets for a vehicle.

Description of the Related Art

The "background" description provided herein is for the purpose of generally presenting the context of the disclosure. Aspects of the description which may not otherwise qualify as prior art at the time of filing, are neither expressly or impliedly admitted as prior art against the present invention.

Drive trains in hybrid vehicles may be of parallel type or of series type. Parallel hybrid drive trains allow both an electric motor and the internal combustion engine to work together to drive the vehicle. Also, the internal combustion engine may operate by itself to drive the vehicle. Series hybrid drive trains may have an arrangement where the internal combustion engine serves only to charge the vehicle's battery. The electric motor is powered by the vehicle's battery to drive the vehicle.

Drive trains in hybrid vehicles may also have an arrangement that is a combination of series and parallel types, or series-parallel hybrid. A simple series-parallel hybrid arrangement may include a planetary gear set in which the sun gear is connected to a first motor generator, a ring gear is connected to a second motor generator, and a planet carrier is connected to an engine. This series-parallel hybrid drive train enables a hybrid vehicle without a stepped gearbox to operate as a type of continuous variable transmission. The planetary gear connecting the engine and two motors may be referred to as a power-split device. The power-split device may be configured various ways. For example, an exemplary power-split device is configured such that a relatively small first motor generator is connected to the sun gear and primarily operates as a generator and a larger second motor generator is connected to the ring gear and primarily operates to drive the wheels. An internal combustion engine is connected to the planet carrier to drive the wheels with assistance from the second motor generator.

Each motor may be a permanent magnet electric motor/generator that includes a rotor and a stator. The motor/generators are capable of producing torque or generating electric power. The rotor, or alternatively the stator, may contain aligned permanent magnets. When current passes through windings of the stator coil, a rotating magnet field is created. The magnetic field pulls the permanent magnets to cause the rotor to turn and create torque. The amount of torque is proportional to the level of current. The speed of rotation can be controlled by the frequency of three-phase current. A permanent magnet electric motor/generator can also function as a generator by applying a force to the rotor containing the permanent magnets such that it rotates to generate a magnetic field and current is created in the stator coils.

The arrangement of the power-split device is such that when the engine is off, the planet carrier is stationary. As the second motor generator begins to operate, the ring gear rotates in a forward direction. When the second motor generator reaches a certain speed, the engine is started by temporarily stopping the first motor generator to stop rotation of the sun gear, which starts rotation of planet gears and the planet carrier to cause the engine to start. As the wheel speed exceeds the engine speed, the second motor may provide assistance to the engine. This transition from vehicle start through higher speeds is accomplished without changing gears in a transmission, and in effect provides operation as the continuous variable transmission. This operation of the hybrid vehicle having a power-split device is a power-split operating mode.

Typically, transmission systems require a torque converter and or step gears for changing torque and rotation speed. Furthermore, due to energy circulation of power from the generator to the motor, the power-split arrangement has relatively high energy losses in highway driving. Also, further improvements in fuel economy, better drivability, as well as improved towing capacity are demanded especially in vehicles such as Crossovers, SUVs, and light and medium duty trucks.

One approach to achieving improved driving force has been to include an additional planetary gear set. FIG. 1 is a diagram of an exemplary power-split arrangement with two planetary gear sets. The arrangement in FIG. 1 may be considered as a compound planetary gear with dual planetary gear stages. Planetary Gear 110 is one planetary gear stage. Planetary Gear 120 is another planetary gear stage. An internal combustion engine 101 is connected to the carrier C2 133 of Planetary Gear 120. A motor/generator MG1 103 is connected to the sun gear S2 123 of Planetary Gear 120. The engine 101 is also connected to MG1 103 through carrier C2 133, thereby being controlled by MG1 103 independent of the vehicle speed. Another motor/generator MG2 105 is connected to the sun gear S1 113 of planetary Gear 110 and is connected to the wheels. The ring gear R2 121 of Planetary Gear 120 is connected to the ring gear R1 111 of Planetary Gear 110. The carrier C1 131 of Planetary Gear 110 is connected to a brake 140. With this arrangement, MG1 103 can be controlled to make the engine 101 operate at minimum fuel consumption for required vehicle power. MG2 105 can be controlled to satisfy the wheel torque according to driver's acceleration (or deceleration) intention. The rotation speed of the motor/generator MG1 103, the rotation speed of the second motor generator MG2 105, and the rotation of the engine 101 are controlled by a controller, often referred to as an electronic control unit (ECU).

However, a configuration such as in FIG. 1 that adds a second planetary gear substantially increases the axial length of the original arrangement. The substantial increase in length of the power-split device leads to a complete redesign of the hybrid drive train, which is undesirable.

There is a need for a power-split hybrid drivetrain that provides improved drivability, fuel economy, as well as improved towing capacity, without substantially increasing the length dimension of the power-split device.

It is one object of the present disclosure to describe a configuration of a power-split device that provides multiple drive modes, improved drivability and fuel economy, all without substantially changing the length of the power split device. In some aspects, the power-split device accomplishes an enhanced power driving mode as well as substantially preventing a change in length by incorporation of a common carrier in combination with one or more clutches or brakes. In some aspects, the power-split device accomplishes an enhanced power driving mode as well as substantially preventing a change in length by incorporation of a nested planetary gear set in combination with one or more selectable one way clutches.

SUMMARY

In an exemplary embodiment, a hybrid drive train includes an input shaft that inputs motive power from an internal combustion engine; an output shaft that outputs to driving wheels; a first electric motor; a nested power splitting planetary gear set comprising a first carrier element and a second carrier element coupled with the input shaft, an inner sun rotary element coupled with the first electric motor and an outer sun rotary element coupled with the output shaft; a second electric motor coupled with the output shaft; a first selectable one-way clutch to control the first and the second carrier element, the first selectable one-way clutch configured to switch between operation as a one way clutch and operation as a brake, a second selectable one-way clutch to control a ring rotary element of the nested planetary gear set, the second selectable one-way clutch configured to switch between operation as a one way clutch and operation as a brake. The power splitting planetary gear set operates in a first operating mode in which the first selectable one-way clutch operates as a brake while the second selectable one-way clutch is released and the second electric motor drives the wheels; the power splitting planetary gear operates in a second operating mode in which the second selectable one-way clutch operates as a brake while the first selectable one-way clutch is released to drive the wheels in power-split, and the power splitting planetary gear operates in a third operating mode in which the first selectable one-way clutch is released and the second selectable one-way clutch is released to drive the wheels at a speed that is faster than the second operating mode.

In another exemplary embodiment, a hybrid drive train including an input shaft that inputs motive power from an internal combustion engine; an output shaft that outputs to driving wheels; a first electric motor; a power splitting gear set including a first planetary gear set comprising a first carrier element, a sun rotary element coupled with the first electric motor and a ring rotary element coupled with the output shaft; and a second planetary gear set comprising a sun rotary element coupled with the input shaft, a ring rotary element and a second carrier element coupled with the first carrier element; a second electric motor coupled with the output shaft; a first selectable one-way clutch to control the sun rotary element of the second planetary gear, the first selectable one-way clutch configured to operate as a one way clutch, a second selectable one-way clutch to control the ring rotary element of the second planetary gear set, the second selectable one-way clutch configured to operate as a brake. The power splitting gear set operates in a first operating mode in which the second selectable one-way clutch operates as a brake and the first selectable one-way clutch is locked such that the second electric motor drives the wheels; the power splitting gear set operates in a second operating mode in which the first selectable one-way clutch is released while the second selectable one-way clutch operates as brake to drive the wheels in power-split; and the power splitting gear set operates in a third operating mode in which the first selectable one-way clutch is locked while the second selectable one-way clutch is released to drive the wheels at a speed that is faster than the second operating mode.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
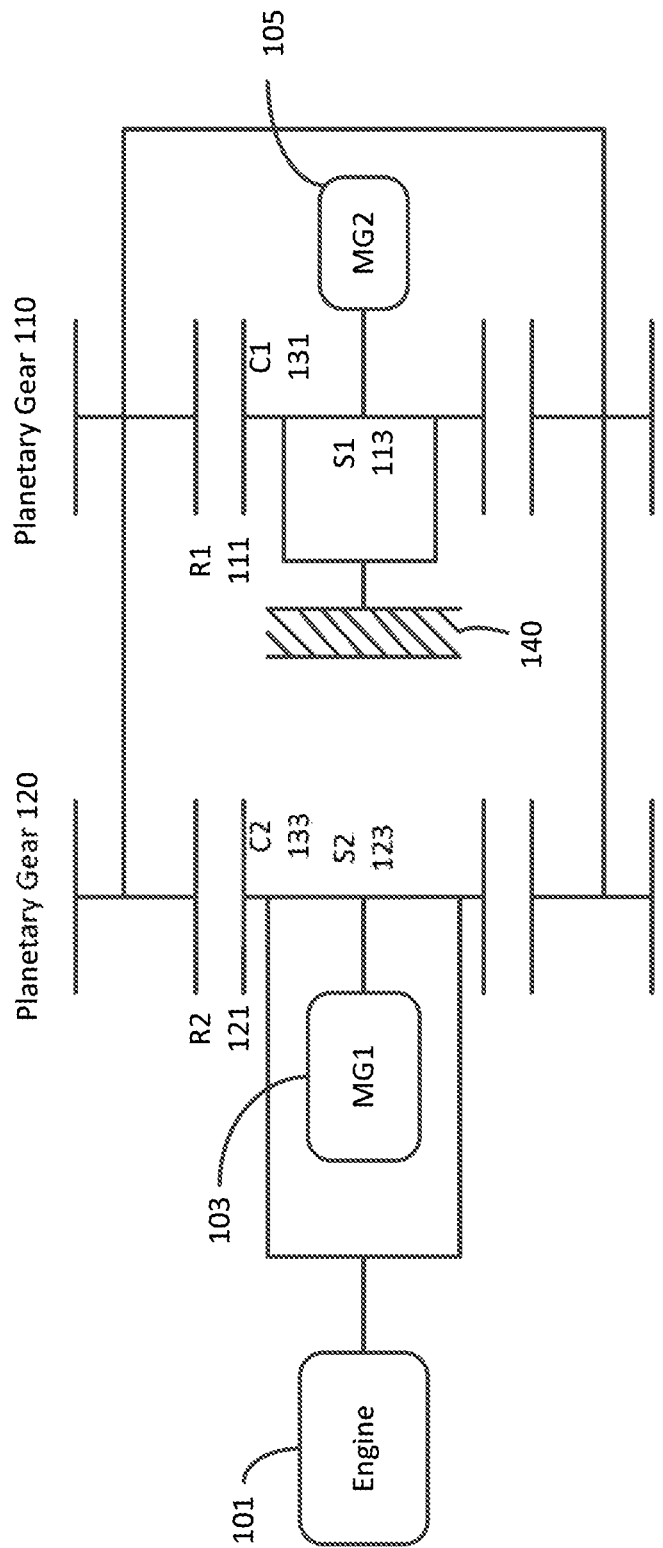
FIG. 1 is a diagram of an exemplary power-split arrangement with two planetary gear sets.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "substantially," "approximately," "approximate," "about," and similar terms generally refer to ranges that include the identified value within a margin of 20%, 10%, or preferably 5%, and any values therebetween.

Aspects of this disclosure are directed to adding multiple drive modes to a power split device in order to achieve enhanced driving power, better drivability and fuel economy without substantially increasing the length of the power split device. A further aspect is a power split device that incorporates a common carrier and one or more selectable one way clutches. A further aspect is a power split device that adds planetary gears one or more selectable one way clutches. By configuring a selectable one way clutch to be switchable from operation as a one way clutch to operation as a brake to lock the planetary gear of the power split device, the power split device perform multiple EV driving modes, and can enhance tri-power driving, which includes power from two motor generators and an engine.

A selectable one-way clutch may be configured to operate as a one-way clutch in a clockwise direction, or to be locked in the counter-clockwise direction to operate as a brake. The selectable one-way clutch may also be configured to operate as a one-way clutch in a counter clockwise direction. Further, the selectable one-way clutch may be configured to operate as an open clutch which moves freely in both directions.

Many different devices including solenoids, hydraulic valves, linear actuators, and DC motors may be used to actuate a selectable one-way clutch. In the case of hydraulic actuation, a forward port may receive pressure enabling the selectable one-way clutch to operate as a standard one-way clutch. In reverse actuation, both ports may be pressurized, locking the selectable one-way clutch from rotating in either direction. This enables the selectable one-way clutch to act as a brake holding the planetary carrier.

Figure 2:
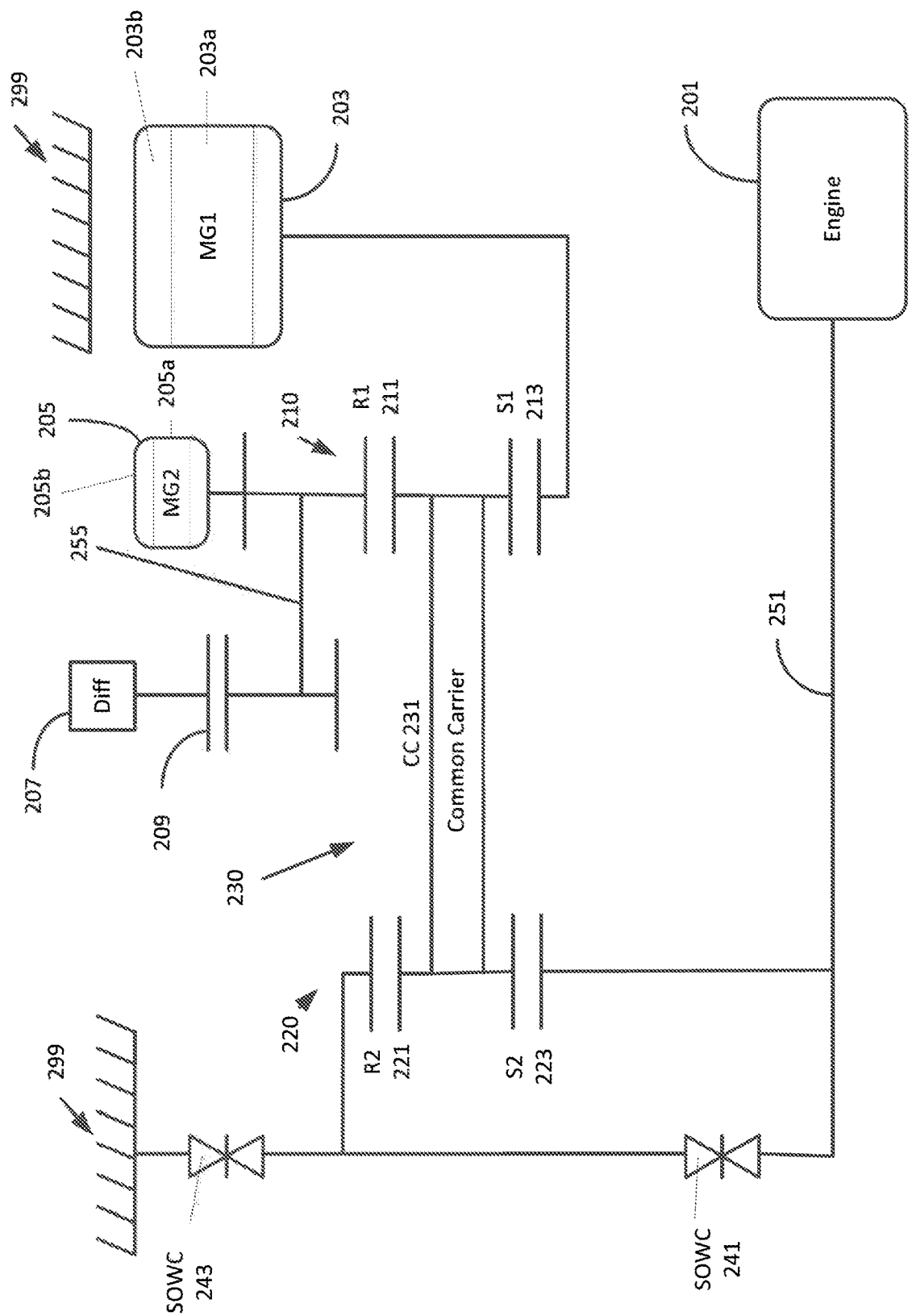
FIG. 2 is a skeleton view of a two motor power-split hybrid system with a common carrier in accordance with an exemplary aspect of the disclosure.

FIG. 2 is a skeleton view of a two motor power-split hybrid arrangement having a common carrier in accordance with an exemplary aspect of the disclosure. This power-split hybrid arrangement reduces its length by incorporating a common carrier between two planetary gear sets. The arrangement having a common carrier requires special control to accomplish desired operation modes, which special control may be accomplished by configuration and operation of the selectable one-way clutches. Regarding FIG. 2, the internal combustion engine 201 is a primary power source that transmits mechanical power through a main shaft 251. The main shaft 251 is connected to a sun gear 223 (S2) of a second planetary gear set 220. The second planetary gear set 220 drives a first planetary gear set 210 by way of a common carrier 231. The first planetary gear set 210 transmits mechanical power through an output shaft 255 and a reduction gear 209 to a differential 207 to drive wheels of the vehicle. The second motor generator 205 (MG2) may operate as a motor to produce torque and provide mechanical power to the output shaft 255, and through the reduction gear 209 provide power to differential 207 to rotate the wheels of the vehicle. The first motor generator 203 (MG1) may be driven by the sun gear 213 (S1) of the first planetary gear set 210 to generally function as a generator to supply electric power to charge a hybrid vehicle battery.

The second motor/generator 205 (MG2) has a stator 205b fixed to a casing member and a rotor 205a rotatably supported on the inner side of the stator 205b. In some embodiments, the rotor 205a may contain permanent magnets. The rotor 205a of the second motor/generator 205 (MG2) is connected to the output shaft 255. The first motor/generator 203 (MG1) has a stator 203b fixed to the casing member and a rotor 203a rotatably supported on the inner side of the stator 203b. The rotor 203a of the first motor generator 203 (MG1) is connected with the sun gear 213 (S1) of the planetary gear set 210.

The power-split hybrid arrangement of FIG. 2 includes a power splitter 230, a first selectable one way clutch 241 (CL), a second selectable one way clutch 243 (BR), the internal combustion engine 201, the main shaft 251, the first motor generator 203 (MG1), the second motor/generator 205 (MG2), and the output shaft 255. Power splitter 230 includes a first planetary gear set 210, a second planetary gear set 220, and a common carrier 231. Internal combustion engine 201 is connected to the sun gear 223 (S2) of the second planetary gear set 220 via main shaft 251. The first motor generator 203 (MG1) is connected to the sun gear 213 S1 of the first planetary gear set 210. The second motor generator 205 (MG2) is connected to the ring gear 211 (R1) of the first planetary gear set 210.

The first selectable one-way clutch 241 (CL) is mounted between the main shaft 251 and the ring gear 221 (R2) of the second planetary gear set 220. The second selectable one-way clutch 243 (BR) is mounted between casing 209 and ring gear 221 (R2) of the second planetary gear set 220.

Figure 3:
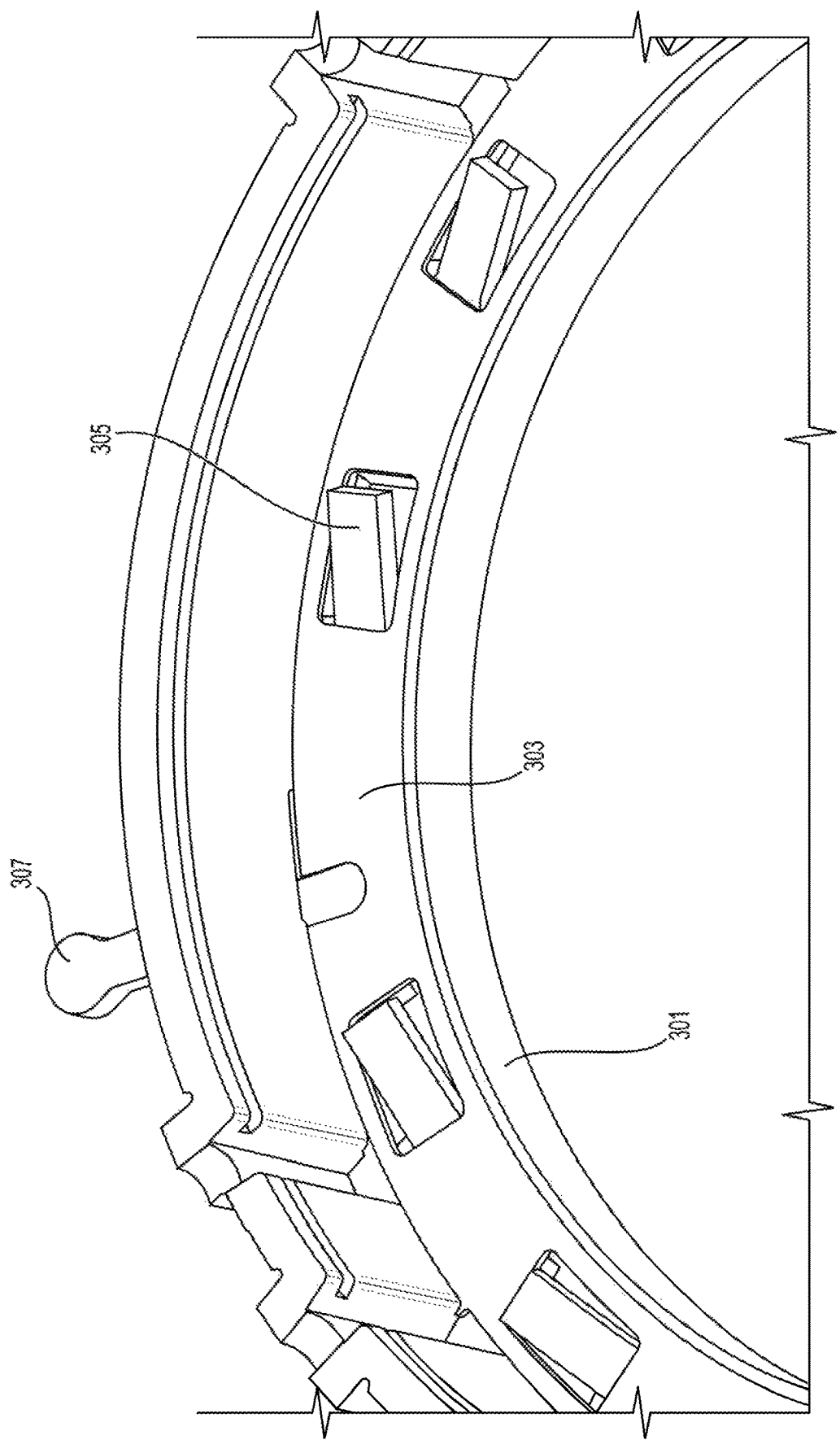
FIG. 3 is a perspective view of a portion of an exemplary selectable one way clutch.

Both the first selectable one-way clutch 241 and the second selectable one-way clutch 243 may be for example, a selectable one-way clutch of Means Inc. or a multi-mode clutch of Borg Warner Inc. FIG. 3 illustrates a perspective view of an exemplary selectable one way clutch with tangential actuation. The selectable one way clutch in FIG. 3 is but one of several types of selectable or multi-mode clutches. A difference includes the method of operation and whether control is provided axially or tangentially to the clutch. In disclosed embodiments, the selectable one way clutches are mounted to control operation of a ring gear of a planetary gear set.

Regarding FIG. 3, a selectable one-way clutch may include a pocket plate 301 and a selector plate 303. Also in addition to the pocket plate 301 and the selector plate 303 is a notch plate. The pocket plate 301 includes struts 305 and springs. The struts and the springs sit in pockets underneath of the struts. The notch plate transfers torque from the pocket plate 301 through the struts 305. The selector plate 303 controls the selectable one-way clutch by shifting interchangeably between modes. As the selector plate 303 shifts, the struts are allowed to emerge and can engage in torque transfer. The shift may be enacted by a tangential force applied to a lever 307. The selector plate 303 may be shifted to cover only forward struts which create one-way clutch functionality of overrunning in the clockwise direction. The selector plate 303 may be shifted to cover only reverse struts which create one-way clutch functionality in the counter-clockwise direction. Further, the selector plate 303 may be shifted to cover both the forward and reverse struts to create overrun functionality in both directions. As such, the selectable one-way clutch may be configured into modal combinations including one or more of clockwise one-way clutch mode, counter clockwise one-way clutch mode, open clutch mode free wheel in either direction. The selectable one-way clutch may also be configured to include a mode as a brake, where the clutch is locked from rotating in either direction.

The first selectable one-way clutch 241 (CL) may be configured to switch between freewheeling and operation as a one-way clutch. In particular, forward struts 305 may be engaged with the selector plate 303 to allow the selectable one-way clutch 241 to operate as a one-way clutch. The second selectable one-way clutch 243 (BR) may be configured to switch between engaged as a one way clutch and locked to the casing 299 to operate as a brake. In particular, the selectable one-way clutch 243 may be switched from operation as a one way clutch to operation as a break by locking the struts 305 to prevent rotation (e.g., of ring gear 221) in either direction. As such, the first selectable one-way clutch 241 (CL) may be used to stop or allow rotation of the internal combustion engine 201 relative to rotation of the ring gear 221 (R2). The second selectable one-way clutch 243 (BR) may be used to stop rotation of the ring gear 221 (R2) of the second planetary gear set 220.

Controlling the operation mode of the first selectable one-way clutch 241 (CL) and the second selectable one-way clutch 243 (BR) allows for control of the speed of the common carrier 231 (CC) via the ring gear 221 (R2). Also, controlling the operation mode of the first selectable one-way clutch 241 and the second selectable one-way clutch 243 enables two additional driving modes while reducing energy losses at highway speeds. When the ring gear 221 (R2) is locked by the second one-way clutch 243 operating as a brake and the first one-way clutch 241 is engaged to operate as a one way clutch to provide a coupling with the main shaft 251, the common carrier 231 does not rotate. When the first selectable one-way clutch 241 is disengaged, the common carrier 231 may be rotated. When the first selectable one-way clutch 241 is re-engaged, and the second selectable one-way clutch 243 is released to operate in a freewheeling mode, the common carrier 231 may be rotated at a higher speed.

Figure 4:
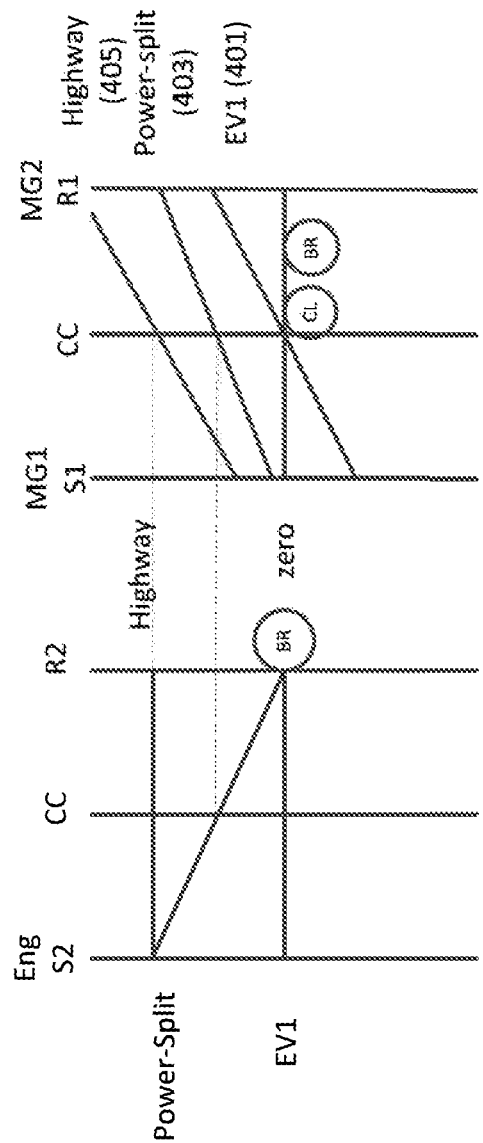
FIGS. 4A and 4B are a speed diagram and mode table for the hybrid system of FIG. 2.

Provided the configuration in FIG. 2, different operating movies of the power-split device 230 may be accomplished based on control of the speed of the common carrier 231. FIGS. 4A and 4B are a speed diagram (also referred to as a nomograph with an RPM axis) and mode table, respectively, for the hybrid system of FIG. 2. A planetary gear set has a relationship between speeds that satisfy:

$$w_s S + w_r R = w_c (R + S)$$

where S is the radios of the sun gear, R is the radios of the ring gear. The speeds are of the ring gear ($w_s$), sun gear ($w_r$), and carrier ($w_c$).

In one mode 401 (referred to as a low speed EV mode), the common carrier 231 is held to zero speed. In this mode 401, the second selectable one-way clutch 243 (BR) is locked to operate as a brake, stopping rotation of ring gear 221 (R2). The first selectable one-way clutch 241 (CL) is engaged to operate as a one way clutch to connect the engine 201 by coupling with the main shaft 251 to the casing 299 through the second selectable one-way clutch 243, and thus the engine does not rotate. In this mode 401, the second motor/generator 205 (MG2) may directly drive the output shaft 255 to provide power through reduction gear 209 and differential 207 to drive the w heels of the vehicle. The stationary common carrier 231 (CC) allows the motor/generator 203 (MG1) to be rotated. An electric power supply from the hybrid vehicle battery to the second motor/generator 205 (MG2) provides drive torque to drive the wheels of the vehicle.

In a second mode 403 (referred to as regular city mode or power-split mode, and including engine starting), the common carrier 231 (CC) is rotated at a medium speed. In this mode, the second selectable one-way clutch 243 (BR) remains locked to operate as a brake while the first selectable one-way clutch 241 (CL) is disengaged which allows the engine 201 to be rotated by way of the sun gear 223 (S2). In particular, as the second motor/generator 205 (MG2) is increased in speed, the one way clutch 241 (CL) is disengaged. Then, the first motor/generator 203 (MG1), rotating in the same direction as the engine 201, starts the engine. In particular, some load from the first motor generator 203 (MG1) is diverted to crank the engine as the one way clutch 241 (CL) is being disengaged. Once the engine 201 is started, the engine 201 turns the sun gear 223 (S2), the ring gear 221 (R2), and the common carrier 231 (CC). The first motor/generator 203 (MG1) is rotated to operate at a speed that is sufficient to function as a generator at a moderate speed and provide electricity for the second motor/generator 205 (MG2). The second motor/generator 205 (MG2) is controlled to operate as a speed that maintains the speed of the engine 201 at an optimal speed range.

In a third mode 405 (referred to as highway speed efficiency mode), the common carrier 231 (CC) rotates at a higher speed than the second mode. In this mode 405, the first selectable one-way clutch 241 (CL) is engaged to operate as a one way clutch to transmit torque and the second selectable one-way clutch 243 (BR) is released (freewheeling). With the second selectable one-way clutch operating as a one way clutch, the engine 201 drives the second planetary gear set 220. In particular, the engine 201 turns the sun gear 223 (S2), the ring gear 221 (R2), and the common carrier 231 (CC). The first motor generator 203 (MG1) rotates in a direction to operate as a motor to turn the sun gear 213 (S1) and the ring gear 211 (R1). The second motor generator 205 provides torque to turn the ring gear 211 (R1), such that collectively, the engine 201 together with assistance of driving force from the first motor/generator 203 (MG1) rotate the common carrier 231 (CC) at a higher speed. The speed of the engine 201 may be controlled to stay in an optimal speed range while the speed of the motor/generators 203 (MG1) and 205 (MG2) are used to supplement the engine 201 to provide drive torque and control the speed of the wheels. In particular, by providing some driving power by the first motor generator 203 (MG1), the rotation speed of the second motor generator 205 (MG2) can be held to a lower speed while the vehicle is cruising at a highway speed. As such, power loss is reduced at highway speed while increasing power for enhanced towing capacity.

The two motor power-split hybrid arrangement having a common carrier of FIG. 2 has a reduced axial length power-split device compared to an arrangement having dual planetary gear sets as in FIG. 1. The power-split arrangement of FIG. 2 provides two additional drive modes for improved drivability and fuel economy, while efficiently increasing power for enhanced lowing capacity.

Figure 5:
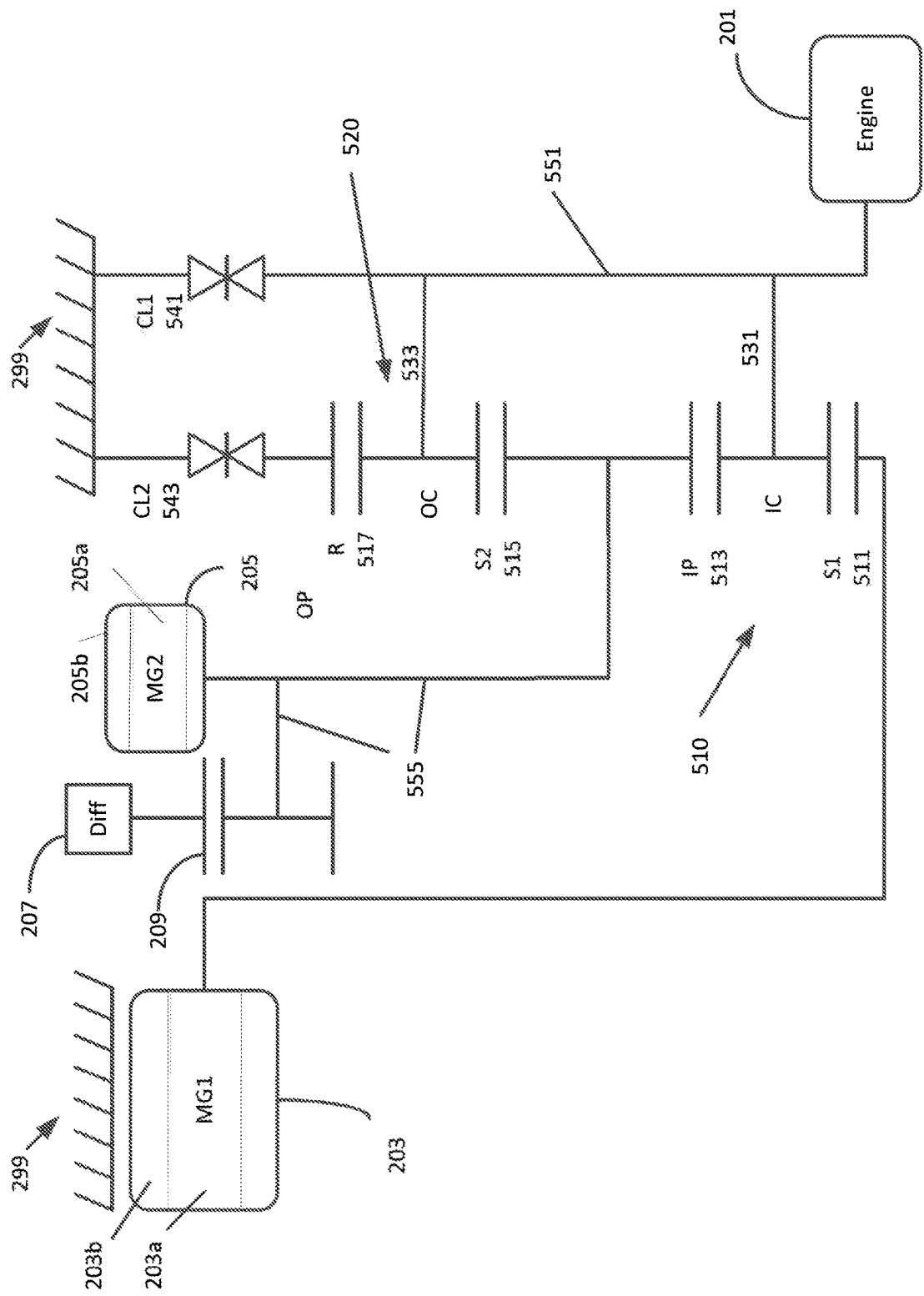
FIG. 5 is a skeleton view of a two motor power-split system with a nested planetary gear set in accordance with an exemplary aspect of the disclosure.

FIG. 5 is a skeleton view of a two motor power-split arrangement having a nested planetary gear set in accordance with an exemplary aspect of the disclosure. The power-split arrangement having a nested planetary gear only requires an addition of an outer planetary gear set to improve towing capacity at higher speeds and does not substantially increase the axial length of the power split device that uses a single planetary gear set. In particular, the nested planetary gear set includes an inner planetary gear set 510 and an outer planetary gear set 520. A rotor 203a, within a stator 203b, of motor generator 203 (MG1) is connected to a sun gear 511 (S1) for the inner planetary gear set 510. The internal combustion engine 201 drives a main shaft 551 that is connected to both the carrier 531 (IC) of the inner planetary gear set 510 and the carrier 533 (OC) of the outer planetary gear set 520. The nested planetary gear set transmits mechanical power through an output shaft 555 and a reduction gear 209 to a differential 207 to drive wheels of the vehicle. A rotor 205a, within a stator 205b, of second motor/generator 205 (MG2) is connected to the sun gear 515 (S2) of the outer planetary gear set 520. By providing an additional planetary gear set arranged in a nested planetary gear set, the functionality of the power-split device can be expanded without substantially increasing the axial length of the original power-split device having a single planetary gear set.

A selectable one-way clutch 543 (CL2) may be mounted to a casing 299 to control the ring gear 517 (R). Another selectable one-way clutch 541 (CL1) may be mounted to the casing 299 to control the carriers 531 (IC) and 533 (OC). Both selectable one-way clutches 541 and 543 may be configured to operate as brakes as well as one way clutches. The one way clutch 541 may be a selectable one-way clutch that is configured to switch between operation as a one way clutch and operation as a brake to stop rotation of the ring gear 517 (R). The selectable one-way clutch 543 may be configured as a brake to allow rotation or stop rotation of the main shaft 551. Controlling the operation modes of the first selectable one-way clutch 541 (CL1) and the second selectable one-way clutch 543 (CL2) allows for control of the speed of the linked carriers 531 (IC) and 533 (OC) via the main shaft 551. Also, the combination of a nested planetary gear set and a selectable one-way clutch mounted to control the ring gear enables an improved balance between the first and second motor/generators while maintaining the speed of rotation of the engine at highway speeds.

Figures 6A, 6B:
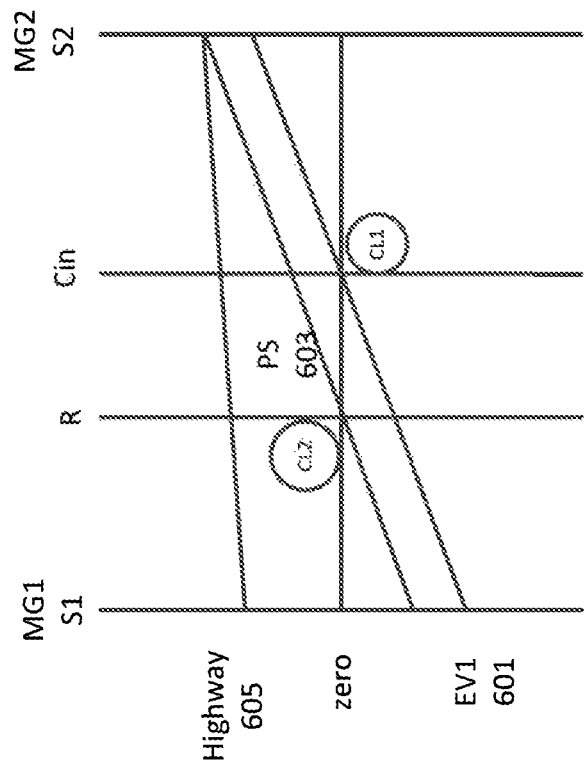
FIGS. 6A and 6B are a speed diagram and mode table for the hybrid system of FIG. 5.

FIGS. 6A and 6B are a speed diagram and mode table for the hybrid system of FIG. 5.

In a first mode 601, the selectable one-way clutch 541 (CL1) operates as a brake to lock the carriers 531 (IC) and 533 (OC) and subsequently prevent rotation of the main shaft 551 while the engine 201 is off (does not rotate). Both carriers 531 (IC) and 533 (OC) and the main shaft 551 are held stationary. The motor/generator 205 (MG2) provides drive torque to turn an output shaft 555, and through a reduction gear 209 and differential 207 drives wheels of the vehicle. The motor-generator 205 (MG2) also provides drive torque to drive the nested planetary gear set which leads to rotation of sun gear 511 (S1). Subsequently, the motor generator 203 (MG1) is turned with the rotation of sun gear 511 (S1).

In a second mode 603, the selectable one-way clutch 543 (CL2) operates as a brake to stop rotation of ring gear 517 (R). The selectable one-way clutch 541 (CL1) is switched to the released state to allow rotation of the main shaft 551. The motor generator 263 (MG1) is rotated at a moderate speed. The speed of the motor/generator 205 (MG2) is increased and the engine 201 is started. Once the engine 201 is started, operation of the engine 201 turns the common carriers 531 (IC) and 532 (OC) to control speed of the wheels.

In a third mode 605, both of the selectable one-way clutches 541 and 543 are released. Selectable one-way clutch 543 (CL2) is released (freewheeling) to allow rotation of the ring gear 517 (R). The selectable one-way clutch 541 (CL1) remains in the released state (freewheeling). In this mode 605, the rotation of motor/generator 203 (MG1) may be reversed and may produce drive torque while the speed of motor/generator 205 (MG2) remains steady. The engine speed may be increased. In this mode 605, an enhanced tri-power driving mode based on operation of both motors to provide drive torque and the engine is achieved with improved drivability and fuel economy.

Figure 7:
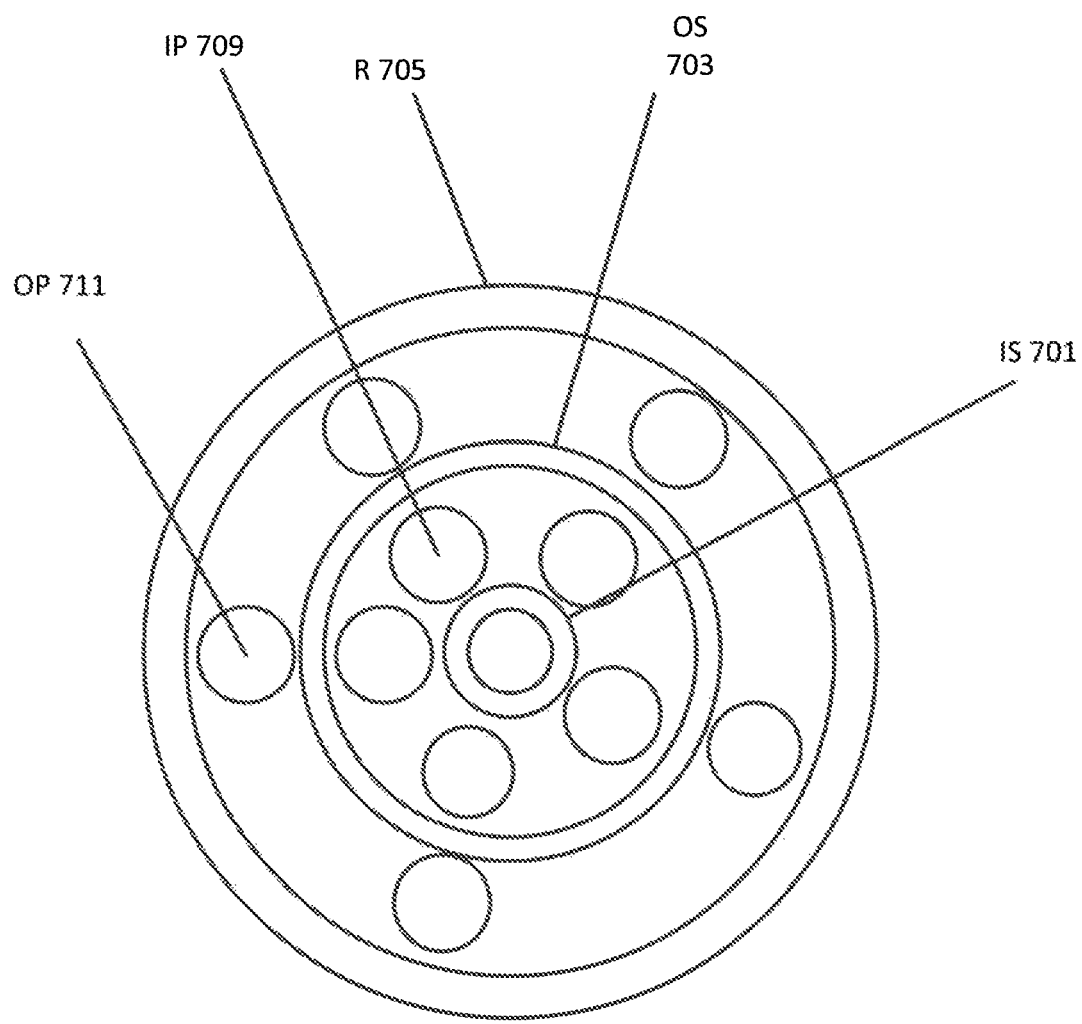
FIG. 7 is an axial view of an exemplary nested planetary gear.

FIG. 7 is an axial view of an exemplary nested planetary gear. The nested planetary gear may include an inner sun gear 701 (IS) and an outer sun gear 703 (OS), where the inner sun gear 701 (IS) is smaller in diameter than the outer sun gear 703 (OS). The nested planetary gear may include inner planetary gears 709 (IP) and outer planetary gears 711 (OP). The outer planetary gears 711 (OP) mesh with a ring gear 705 (R). The ring gear 705 (R) may be held from rotating to allow rotation of the inner sun gear 701 (IS) and the outer sun gear 703 (OS) via rotation of the planetary gears. The carrier may be held from rotating to prevent the planetary gears from moving, but still allow rotation of the planetary gears about fixed axes.

Figure 8:
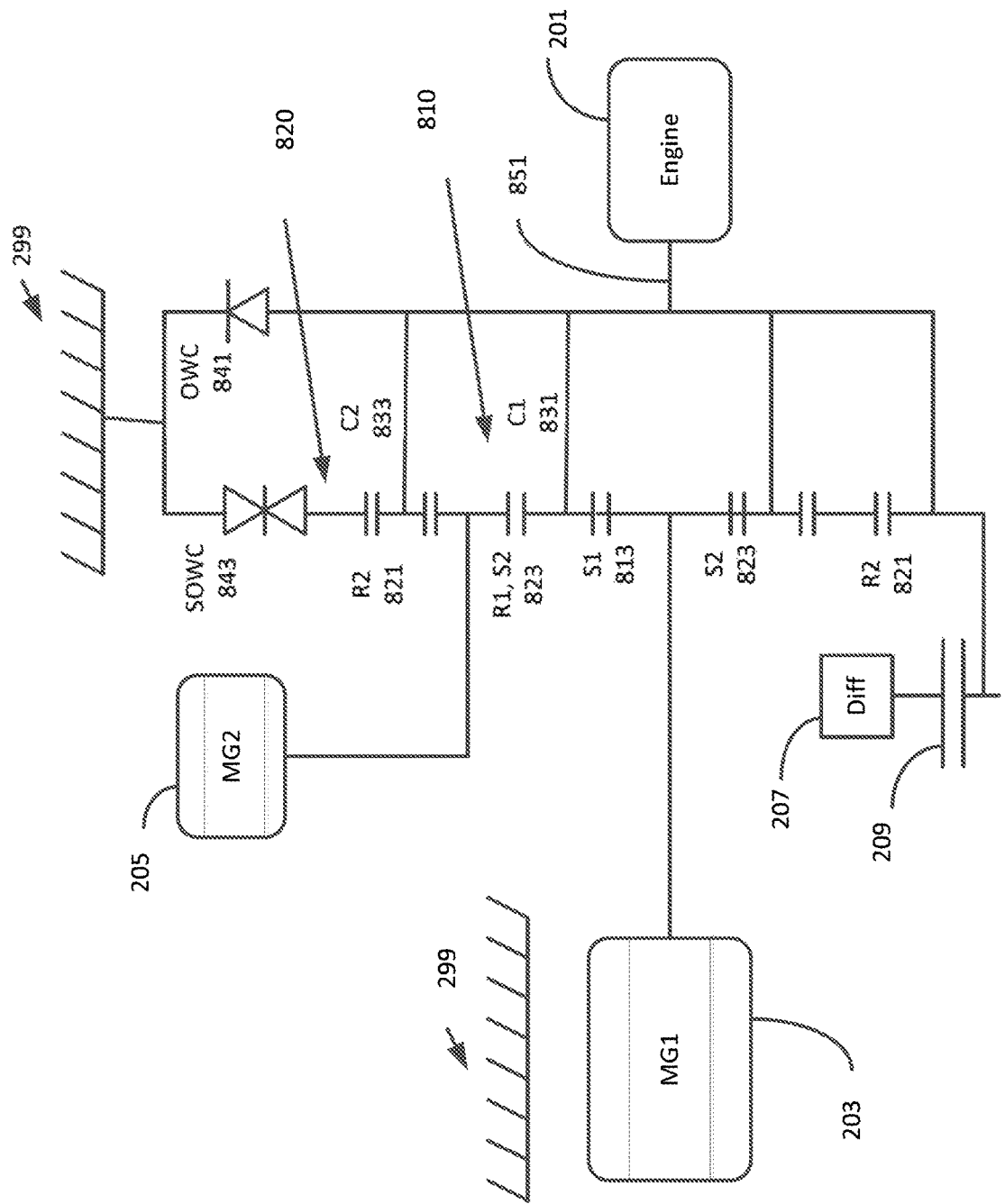
FIG. 8 is a skeleton view of a two motor power-split system with a compound planetary gear set in accordance with an exemplary aspect of the disclosure.

FIG. 8 is a skeleton view of an embodiment of a two motor power-split system with a compound planetary gear set in accordance with an exemplary aspect of the disclosure. Unlike the nested planetary gear set of FIG. 5, the compound planetary gear set 801 may include additional planetary gears. The compound planetary gear set 801 may include an inner planetary gear set 810 (IP) and an outer planetary gear set 820 (OP) each having respective sun gears and carriers. In particular, the compound planetary gear set 801 may include two sun gears 813 (S1) and 823 (S2) and two carriers 831 (C1) and 833 (C2). At least one of the sun gears 823 may function as an inner ring gear R1. A motor/generator 203 (MG1) is connected to the sun gear 813 (S1) of the inner planetary gear set 810 (IP), which provides mechanical power through reduction gear 209 and differential 207 to drive the wheels of the vehicle. An output to the second motor generator 205 (MG2) is connected to the sun gear 823 (S2) of the outer planetary gear set 820 (OP), which is also the ring gear R1. The internal combustion engine 201 (Engine) is connected to both carriers 831, 833 for the inner planetary gear set 810 and the outer planetary gear set 820 by way of shaft 851. In this arrangement, the motor generator 205 (MG2) functions as a generator for charging a hybrid battery.

A selectable one-way clutch 843 (SOWC) may be mounted to a casing 299 to control the ring gear 821 (R2). A one-way clutch 841 (OWC) may be mounted to the casing 299 to control the carriers 831 (IC) and 833 (OC). The selectable one-way clutch 843 may be configured to switch between operation as a brake and operation as a one way clutch. The selectable one-way clutch 843 and the one-way clutch 841 may each be configured to operate as a brake, to enable multiple speeds of rotation of the carriers 831 and 833.

In some embodiments, the selectable one-way clutch 843 (SOWC) and the one-way clutch 841 (OWC) may be combined into a single part. Such a single selectable one-way clutch 843 (SOWC) may be mounted to casing 299 to control both the compound planetary gear set and the earners 831 and 833 for the compound planetary gear set. The single selectable one-way clutch 843 (SOWC) may be configured to operate as a brake for the carriers 831 (C1) and 833 (C2).

Control of the single selectable one-way clutch 843 can be performed to provide several operating modes. In addition to a power split mode, the power split device of FIG. 8 can obtain two different EV modes and an engine only mode for highway vehicle speeds. The selectable one-way clutch 843 may be configured to operate as a brake to stop rotation of both carriers 831 and 833. The selectable one-way clutch 843 may also be configured to operate as a brake to stop rotation of ring gear R2, as well as a one way clutch to transfer rotation of the carriers for a second EV mode and an engine only mode.

Figure 9:
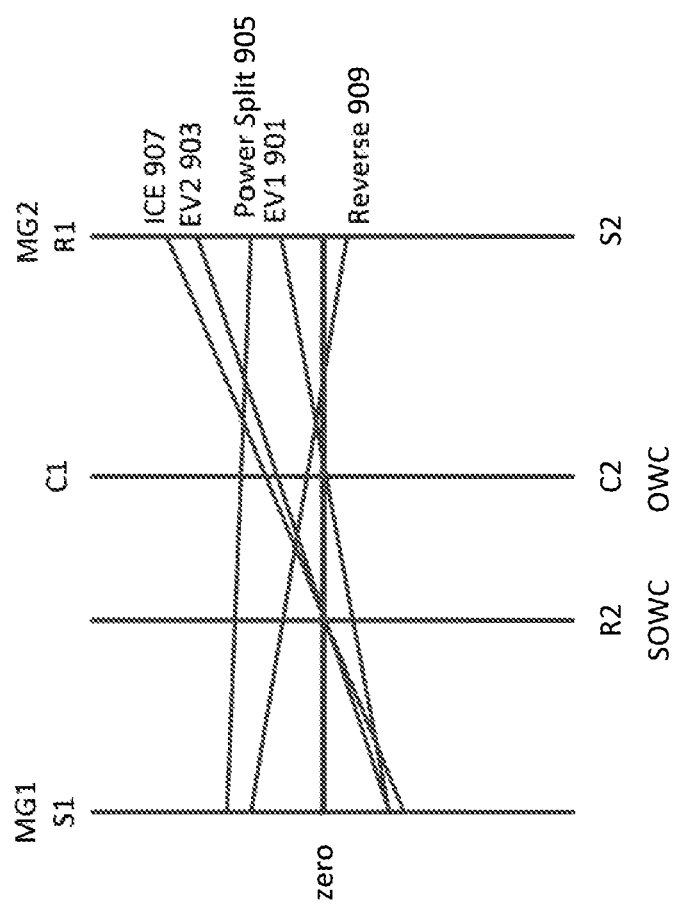
FIG. 9 is a speed diagram for the hybrid system of FIG. 8.

FIG. 9 is a speed diagram for the hybrid system of FIG. 8. Provided the gear arrangement in FIG. 8, the system may operate in two different EV modes. In a first EV mode 901 (EV1), while the selectable one-way clutch 843 (SOWC) locks the carriers 831 (C1) and 833 (C2), the internal combustion engine 201 is off. Motor/generator 203 (MG1) provides drive torque and turns sun gear 813 (S1) to provide mechanical power to a reduction gear 209 and differential 207 to drive wheels of the vehicle. Motor/generator 205 (MG2) is rotated by sun gear 823 (S2) to generate electric power. Thus the motor/generators are operated as complementary drive torque while driving the vehicle at a low speed.

To move the vehicle at a higher speed in a second EV2 mode 903, the single selectable one-way clutch 843 (SOWC) may release the carriers 831, 833 and may lock the outer ring 821 (R2) of the outer planetary gear set 820. This mode 903 operates similarly to EV1 901, except that the engine 201 is allowed to motor to a non-zero speed, which allows a higher vehicle speed.

To move the vehicle at a still higher speed in a power split mode 905, the single selectable one-way clutch 843 (SOWC) may then release the outer ring 821 (R2), which allows the motor/generator 203 (MG1) to contribute a positive drive torque, which together with drive torque provided by rotation of the motor generator 205 (MG2) and power from the internal combustion engine 201 allows the system to operate in a power split mode 905.

As the vehicle moves to highway speeds 907 (ICE only mode), the selectable one-way clutch 843 (SOWC) may again lock the outer ring 821 (R2) to allow the vehicle to move by the internal combustion engine 201 only. In this mode 907, both motor/generators 203, 205 may operate to provide either generating or motoring.

In order to operate a vehicle in reverse, the single selectable one-way clutch 843 may hold the carriers 831 and 833 from rotating while motor generator 205 (MG2) rotates in reverse and motor/generator 203 (MG1) operates as a motor to drive the vehicle in a reverse direction. In other words, rotation of the motor/generators 203 and 205 is in opposite directions and both motor/generators 203 and 205 provide positive torque in their respective opposite directions. In this reverse movie, the motor generator 205 (MG2) and the motor/generator 203 (MG1) may operate with complementary drive torque.

In some embodiments, a separate one-way clutch 841 (OWC) may be mounted to control the carriers 831, 833, and the selectable one-way clutch 843 (SOWC) may be mounted to control the outer ring gear 821 (R2). In such case, in order to operate in reverse, the motor/generator 203 (MG1) and the motor/generator 205 (MG2) may be controlled by an ECU to offset each other's speed.

Figure 10:
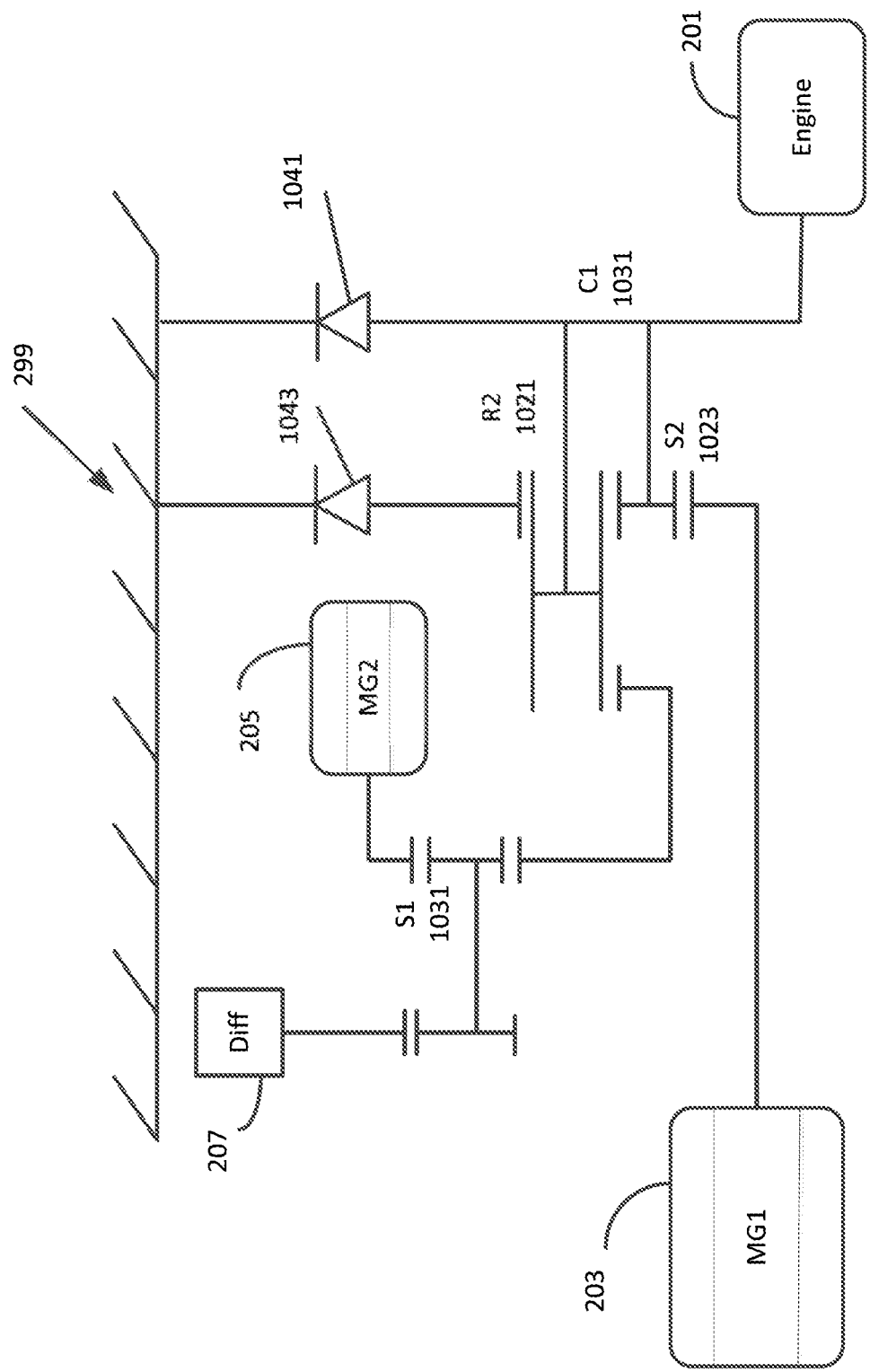
FIG. 10 is a skeleton view of a two motor power-split system with a Ravigneaux gear set in accordance with an exemplary aspect of the disclosure.

FIG. 10 is a skeleton view of a two motor power-split system with a Ravigneaux gear set in accordance with an exemplary aspect of the disclosure. The Ravigneaux gear has two planetary gear trains on a single carrier. It has two sun gears, two ring gears, and two sets of planet gears. The arrangement in FIG. 10 is such that the motor/generator 203 (MG1) is connected to one sun gear 1023 (S2) and the motor/generator 205 (MG2) is connected to another sun gear 1031 (S1). The internal combustion engine 201 is connected to the carrier 1031. One selectable one-way clutch 1041 (SOWC) is mounted to control the carrier 1031 and another selectable one way clutch 1043 (SOWC) is mounted to control a ring gear 1021 (R2). Both selectable one-way clutches are configured to be switched to operate as a brake.

The incorporation of a Ravigneaux gear in a power split device allows an intermediate EV mode (EV2) in which the motor/generator 203 (MG1) is rotated at a lower speed than when the vehicle is operated in a power split mode when the one way clutch 1043 is switched to perform as a brake to stop rotation of ring gear 1021 (R2) and one way clutch 1041 is released to allow the low motor/generator 203 (MG1).

Figure 11:
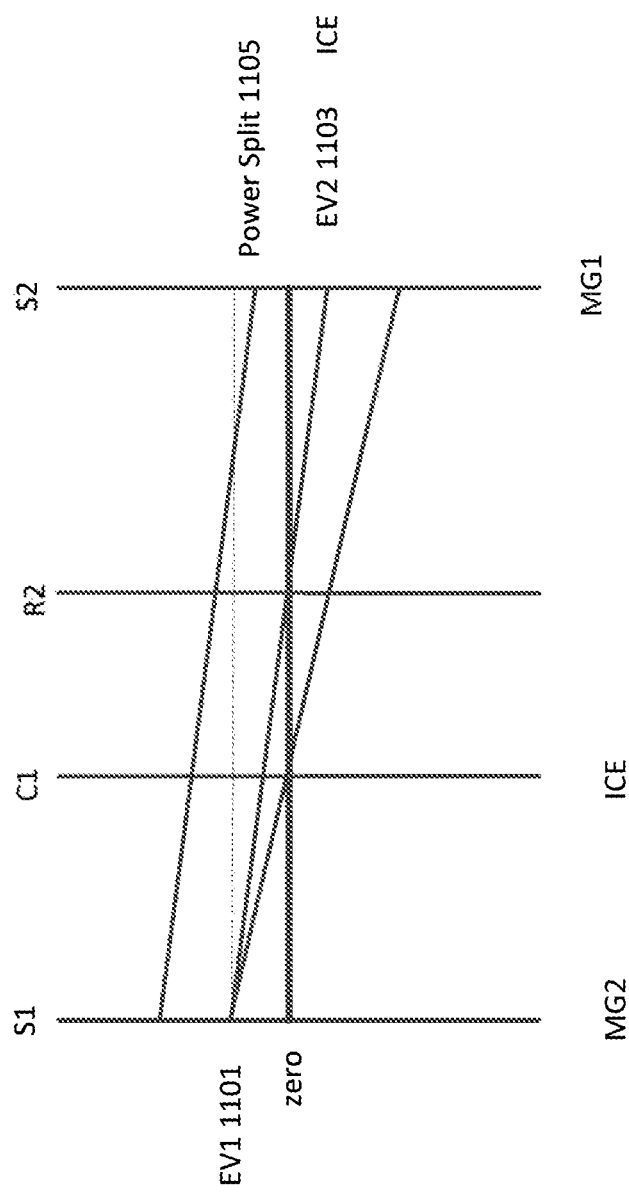
FIG. 11 is a speed diagram for the hybrid system of FIG. 10.

FIG. 11 is a speed diagram for the hybrid system of FIG. 10.

In one mode 1101 (EV1), the carrier 1031 may be locked by switching a selectable one-way clutch 1041 to operate as a brake while the internal combustion engine 201 is off. The vehicle is then driven by motor/generator 205 (MG2) while motor/generator 203 (MG1) rotates to operate as generator.

In another mode 1103 (EV2), to move the vehicle at a higher speed, the selectable one-way clutch 1041 that performs a braking operation to lock the carrier 1031 may be released and the other selectable one-way clutch 1043 is switched to operate as a brake to lock the ring gear 1021 (R2). In such case the speed of the motor/generator 203 (MG1) is reduced and the internal combustion engine 201 begins to turn (is started).

In another mode 1105, as speed of the vehicle is further increased, both brakes 1041 and 1043 may be released and each of the motor generators 203 (MG1) and 205 (MG2), as well as the internal combustion engine 201 may be operated in power-split. Torque from the motor/generator 205 (MG2) and operation of the engine 201 provide mechanical power to rotate the wheels of the vehicle. The motor/generator 203 (MG1) functions as a generator to charge a hybrid battery.

Figure 12:
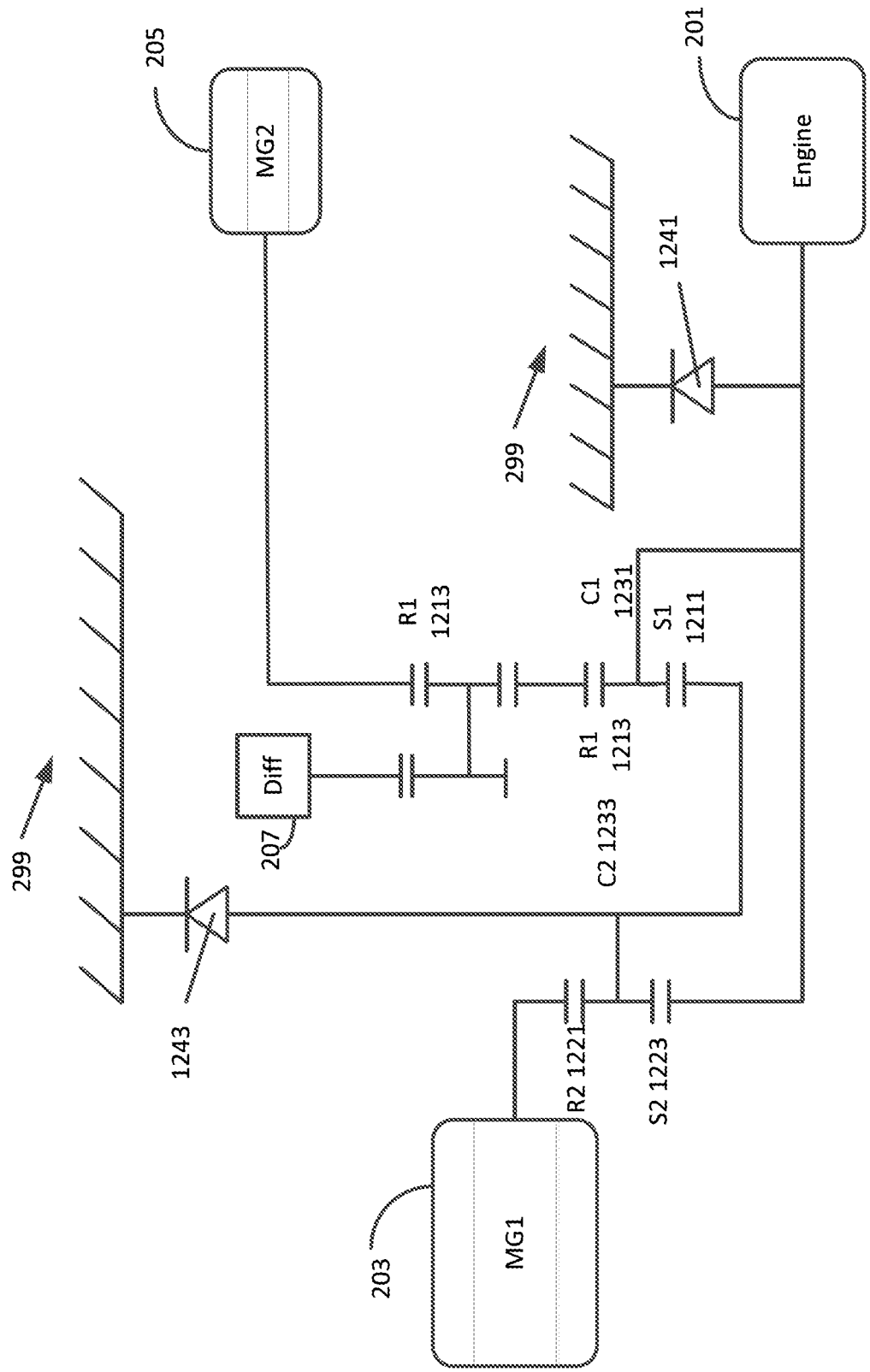
FIG. 12 is a skeleton view of two motor power-split system in which one way clutches are mounted to control respective ring gears in accordance with an exemplary aspect of the disclosure.

FIG. 12 is a skeleton view of two motor power-split system in which selectable one way clutches are mounted to control respective ring gears in accordance with an exemplary aspect of the disclosure. This power split device is arranged with a nested planetary gear set connected to a motor/generator 205 (MG2) and engine 201, while motor/generator 203 (MG1) is connected to a sun gear of a second planetary gear set. This arrangement has potential for improved fuel economy overall operating modes. Motor/generator 203 (MG1) generates electricity for powering motor/generator 205 (MG2) and allows the engine 201 to rotate at a low speed in power split mode.

In this arrangement, a selectable one-way clutch 1241 is mounted to control a carrier 1231 and sun gear 1211 (S1) and another selectable one-way clutch 1243 is mounted to control a ring gear 1221 (R2). Motor/generator 203 (MG1) is connected to a ring gear 1221 (R2) and motor generator 205 (MG2) is connected to a ring gear 1213 (R1).

Figure 13:
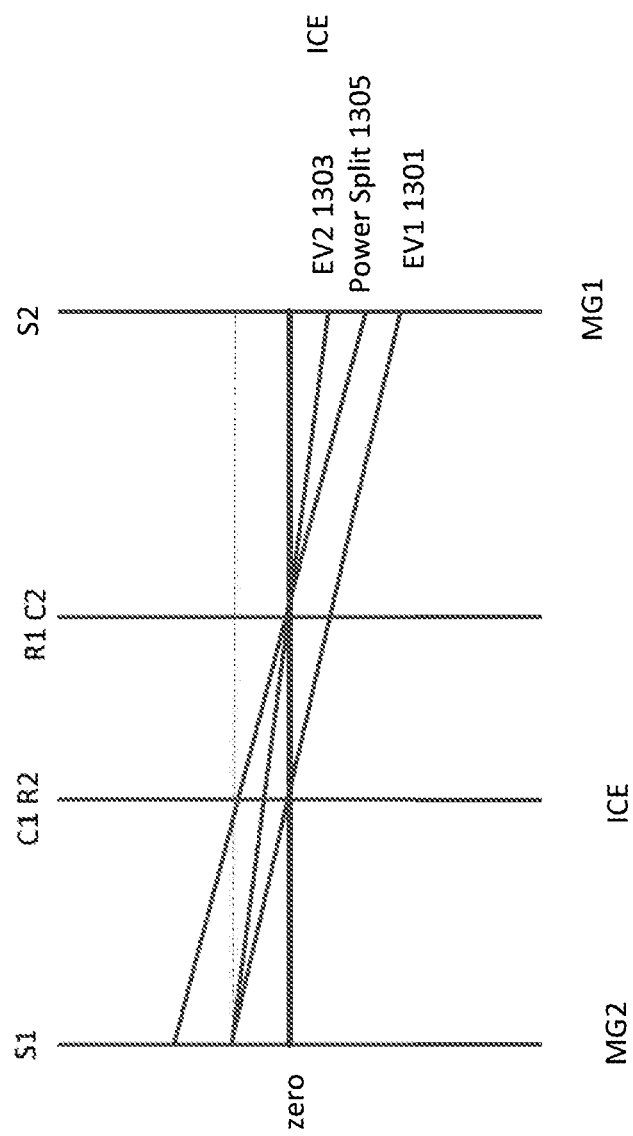
FIG. 13 is a speed diagram for the hybrid system of FIG. 12.

FIG. 13 is a speed diagram for the hybrid system of FIG. 12.

At a low speed mode 1301 (EV1), a selectable one-way clutch 1243 operates as a brake to lock the ring gear 1221 (R2), which the internal combustion engine 201 is connected to, while the engine 201 is off. Motor generator 203 (MG1) offsets the torque of motor generator 205 (MG2) which drives the vehicle.

To increase speed of the vehicle, in another mode 1203 (EV2), the selectable one-way clutch 1243 for the ring gear 1221 (R2) may be released so that the torque offset on the motor/generator 203 (MG1) is reduced and the engine 201 begins to rotate. The other selectable one-way clutch 1241 is switch to operate as a brake to lock the ring gear 1211 (R1).

Releasing both brakes enables a power split operation 1205 between the motor generators MG1 and MG2, while the engine 201 is running at a steady speed.

Figure 14:
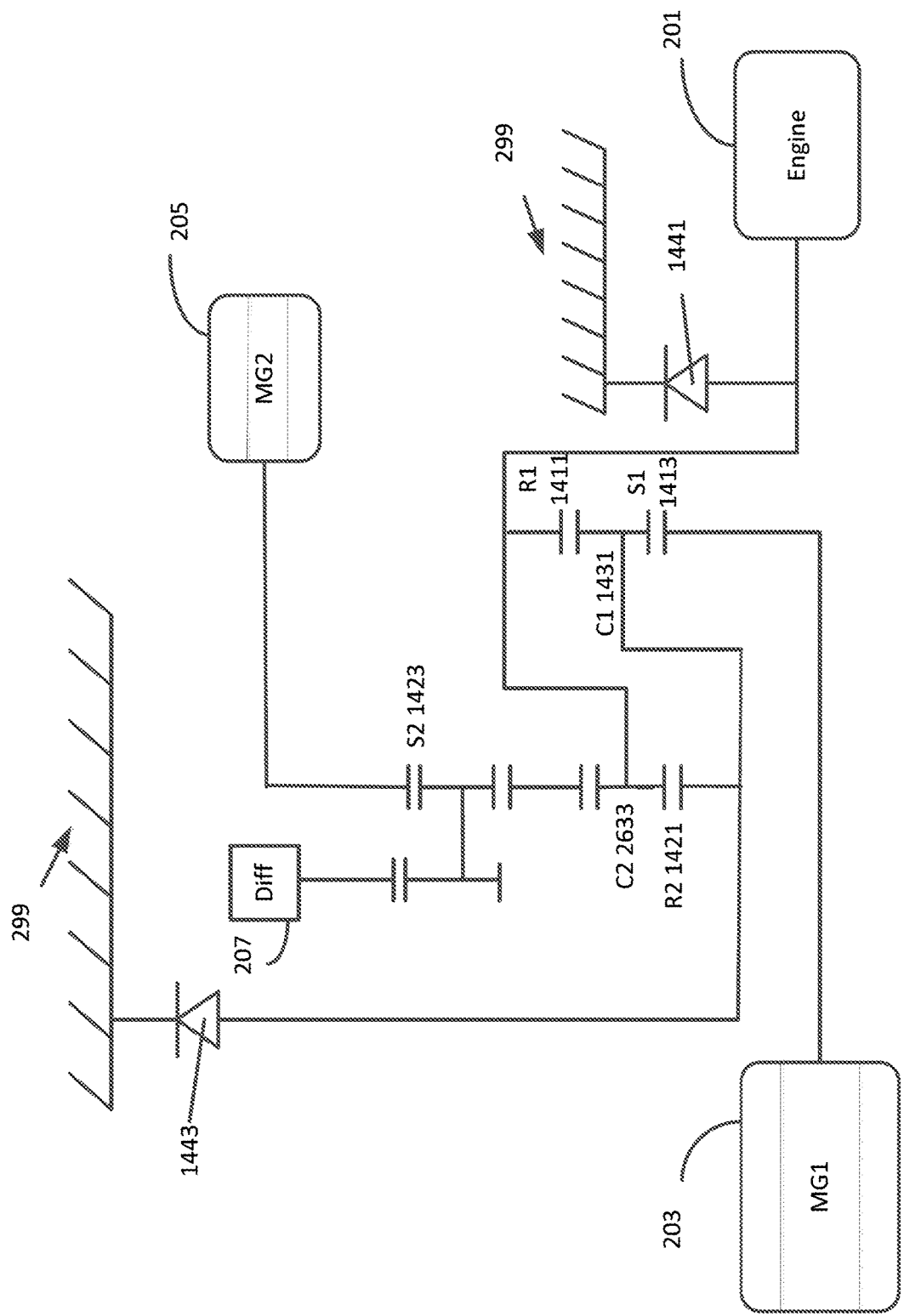
FIG. 14 is a skeleton view of two motor power-split system in which one way clutches are mounted to control respective ring gears with motors connected in opposite arrangement to that in FIG. 12 in accordance with an exemplary aspect of the disclosure.

FIG. 14 is a skeleton view of two motor power-split system in which one way clutches are mounted to control respective ring gears with motors connected in opposite arrangement to that in FIG. 12 in accordance with an exemplary aspect of the disclosure. Unlike the arrangement in FIG. 12, the motor/generator 203 (MG1) is connected to sun gear 1413 (S1) for a planetary gear set having ring gear 1411 (R1) that is controllable by a one way clutch that also controls rotation of the internal combustion engine 201. The motor/generator 205 (MG2) is connected to sun gear 1423 (S2). This alternative arrangement provides a reversal of roles of motor/generator 203 (MG1) and motor generator 205 (MG2).

Figure 15:
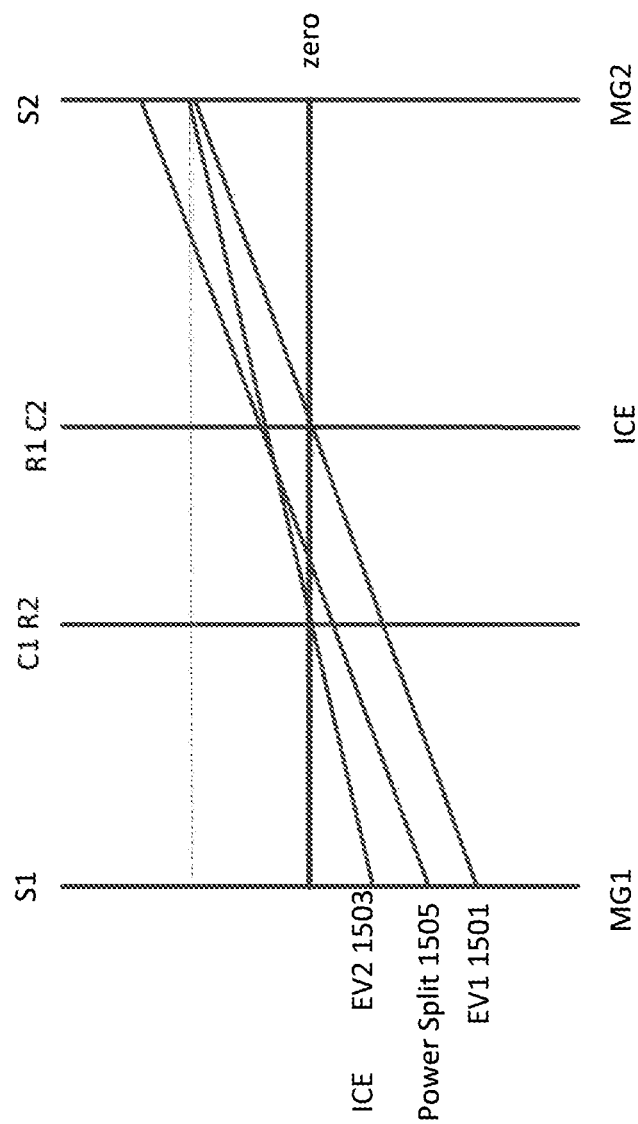
FIG. 15 is a speed diagram for the hybrid system of FIG. 14.

FIG. 15 is a speed diagram for the hybrid system of FIG. 14.

At a low speed mode 1501 (EV1), a selectable one-way clutch 1441 is configured to operate as a brake to lock the ring gear 1411 (R1), which the internal combustion engine 201 is connected to, while the engine 201 is off. Motor/generator 203 (MG1), at negative rotation, offsets motor/generator 205 (MG2) which drives the vehicle.

While the speed of the vehicle is being increased, in another mode 1503 (EV2), the selectable one-way clutch 1441 for the ring gear 1411 (R1) may be released so that the torque offset on the motor/generator 203 (MG1) is reduced and the engine 201 begins to rotate. The other selectable one-way clutch 1443 is switched to operate as a brake to lock the ring gear 1421 (R2).

While further increasing the vehicle speed, both brakes are released to enable a power split operation 1505 between the motor generators MG1 and MG2, while the engine 201 is running at a steady speed. Similar to the arrangement in FIG. 12, the engine speed can be kept slow in power split mode.

Figure 16:
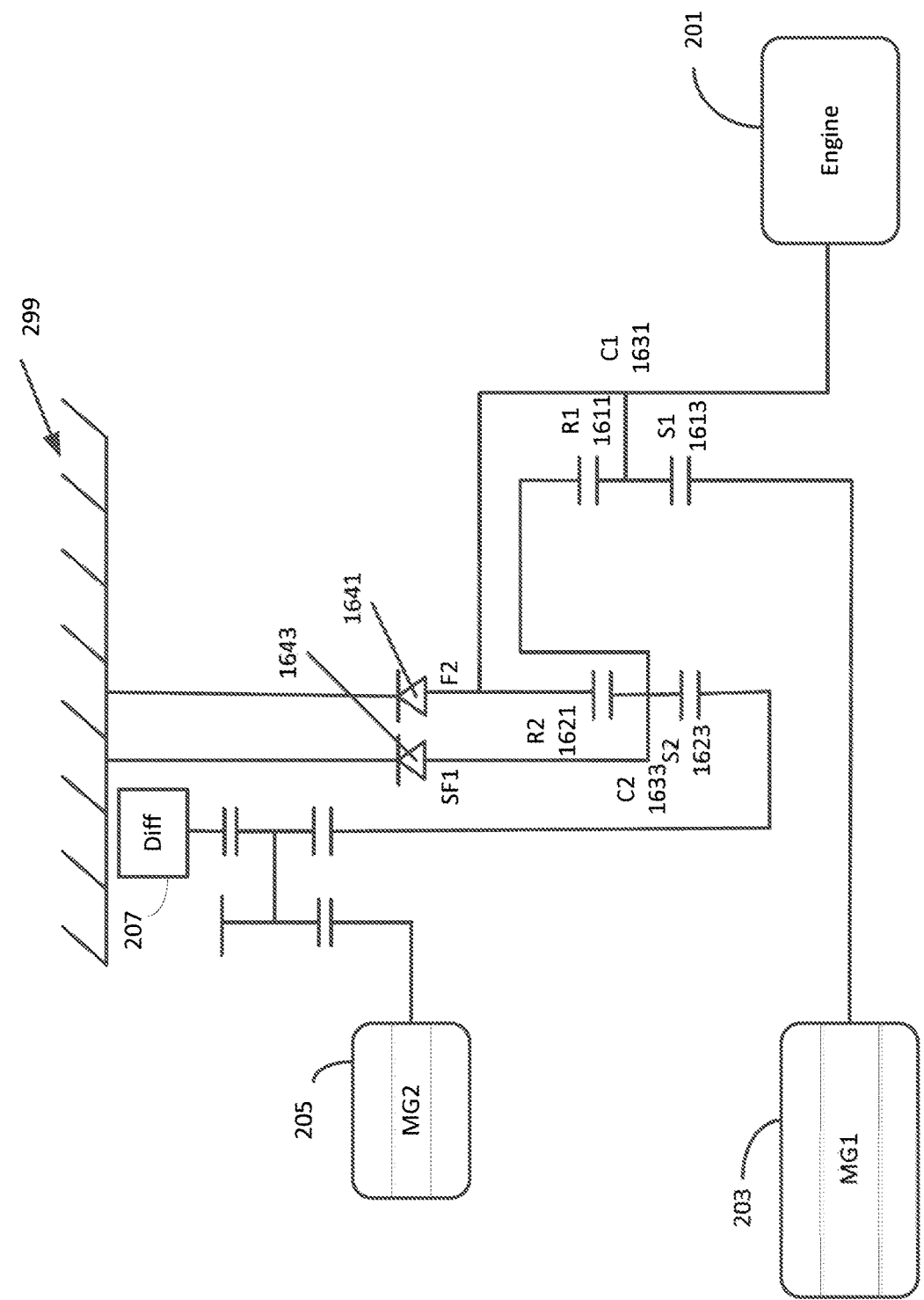
FIG. 16 is a skeleton view of two motor power-split system in which one way clutches are mounted to control respective carriers with motors connected in opposite arrangement to that in FIG. 12 in accordance with an exemplary aspect of the disclosure.

FIG. 16 is a skeleton view of two motor power-split system in which one way clutches are mounted to control respective carriers with motors connected in opposite arrangement to that in FIG. 12 in accordance with an exemplary aspect of the disclosure. This power split device includes two planetary gear sets where each planetary gear set has an associated one way clutch configured to operate as a brake. A one way clutch 1641 is mounted to control a carrier 1631 (C1) which is driven by the internal combustion engine 201. Another one way clutch 1643 is mounted to control a carrier 1633 (C2). Motor generator 203 (MG1) is connected to a sun gear 1613 (S1), while motor/generator 205 (MG2) is indirectly driven by a sun gear 1623 (S2). With this arrangement, the engine 201 may be rotated at a slow speed at power split mode to improve fuel economy.

Figure 17:
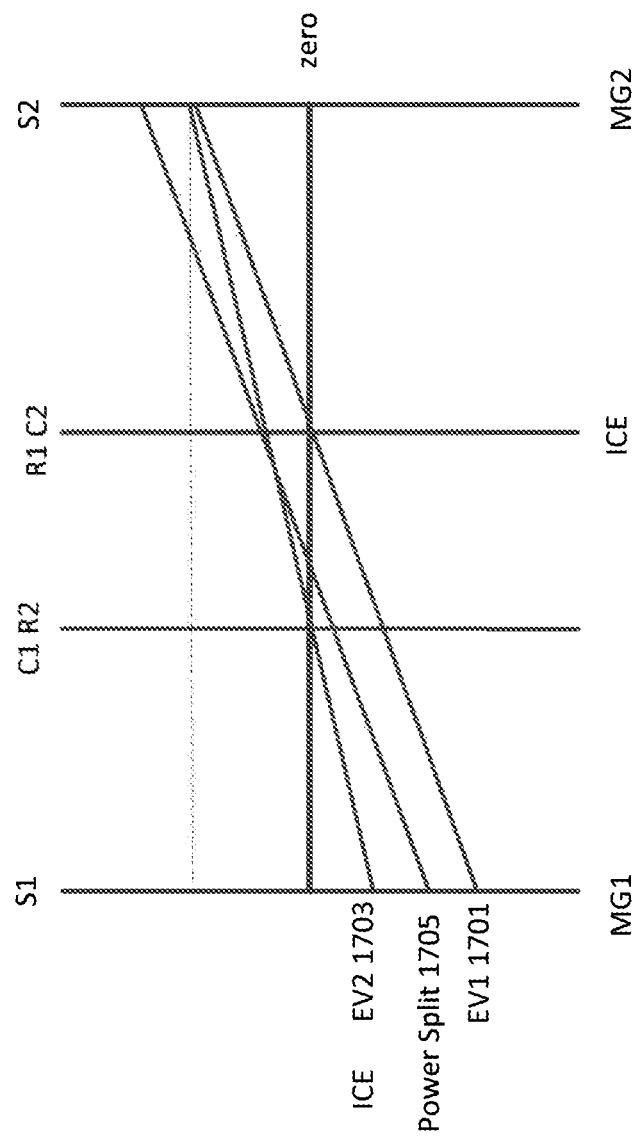
FIG. 17 is a speed diagram for the hybrid system of FIG. 16.

FIG. 17 is a speed diagram for the hybrid system of FIG. 16.

At a low speed mode 1701 (EV1), a selectable one-way clutch 1643 operates as a brake to lock the carrier 1633 (C2), which is connected to ring gear 1611 (R1), while the engine 201 is off. Motor/generator 203 (MG1) offsets motor generator 205 (MG2), which drives the vehicle.

While the speed of the vehicle is being increased, in another mode 1703 (EV2), the selectable one-way clutch 1641 for the ring gear 1621 (R2) and carrier 1631 (C1) may be locked so that the torque offset on the motor/generator 203 (MG1) is reduced. The other selectable one-way clutch 1641 is switched to release the ring gear 1611 (R1) and the engine 201 is started.

While further increasing the vehicle speed, both one way clutches are released to enable a power split operation 1705 between the motor generators MG1 and MG2, while the engine 201 is running.

Numerous modifications and variations of the present invention are possible in light of the above teachings. It is therefore to be understood that within the scope of the appended claims, the invention may be practiced otherwise than as specifically described herein.

The invention claimed is:

1. A hybrid drive train, comprising:
an input shaft that inputs motive power from an internal combustion engine;
an output shaft that outputs to drive wheels of a vehicle;
a first electric motor;
a compound planetary gear set comprising two sun gears and two carriers, wherein an outer sun gear of the sun gears functions as an inner ring gear,
the first electric motor is connected to an inner one of the sun gears, which provides mechanical power through a reduction gear and a differential to drive the wheels of the vehicle;
a second electric motor coupled with the output shaft is connected to the outer sun gear; and
a selectable one-way clutch to control the sun gears and an outer ring gear and the carriers,
the selectable one-way clutch is configured to operate as a brake to stop rotation of both of the carriers, configured to operate as a brake to stop rotation of the outer ring gear, as well as configured as a one way clutch to transfer rotation of the two carriers for a second EV mode and an engine only mode.

2. The hybrid drive train of claim 1, wherein in a first operating mode the selectable one-way clutch locks both of the carriers, the internal combustion engine is off, the first electric motor provides drive torque and turns an inner sun gear of the sun gears to provide to the reduction gear and the differential to drive the wheels of the vehicle.

3. The hybrid drive train of claim 1, wherein in a second operating mode the selectable one-way clutch releases the carriers and locks the outer ring gear.

4. The hybrid drive train of claim 1, wherein in a third operating mode the selectable one-way clutch releases the outer ring gear, which allows the first electric motor to contribute a positive drive torque, which together with drive torque provided by rotation of the second electric motor and power from the internal combustion engine allows the vehicle to operate in a power split mode.

5. The hybrid drive train of claim 1, wherein in a fourth operating mode the selectable one-way clutch locks the outer ring gear to allow the vehicle to move by the internal combustion engine only.

6. The hybrid drive train of claim 1, wherein in a reverse operating mode the selectable one-way clutch holds the carriers from rotating while the second electric motor rotates in reverse and the first electric motor operates as a motor to drive the vehicle in a reverse direction.

* * * * *